United States Patent [19]

Cherukuri et al.

[11] Patent Number: 5,110,608
[45] Date of Patent: * May 5, 1992

[54] CHEWING GUMS HAVING LONGER LASTING SWEETNESS

[75] Inventors: Subraman R. Cherukuri, Towaco; Steven M. Faust, Stanhope, both of N.J.; Gul Mansukhani, Staten Island, N.Y.

[73] Assignee: Warner-Lambert Company, Morris Plains, N.J.

[*] Notice: The portion of the term of this patent subsequent to Jun. 12, 2007 has been disclaimed.

[21] Appl. No.: 490,871

[22] Filed: Mar. 9, 1990

Related U.S. Application Data

[63] Continuation-in-part of Ser. No. 291,704, Dec. 29, 1988.

[51] Int. Cl.⁵ ............................................. A23G 3/30
[52] U.S. Cl. ................................. 426/3; 426/548; 426/658; 426/804
[58] Field of Search .................................... 426/3-6, 426/548, 804, 658

[56] References Cited

U.S. PATENT DOCUMENTS

| | | | |
|---|---|---|---|
| 4,536,896 | 8/1985 | Stephens | 426/3 |
| 4,765,991 | 8/1988 | Cheruhuri et al. | 426/3 |
| 4,794,003 | 12/1988 | Cheruhuri et al. | 426/3 |
| 4,820,528 | 4/1989 | Stroz | 426/3 |
| 4,834,986 | 5/1989 | Glass et al. | 426/3 |
| 4,872,884 | 10/1989 | Cheruhuri et al. | 426/3 |
| 4,915,958 | 4/1990 | Faust et al. | 426/3 |
| 4,933,189 | 6/1990 | Cheruhuri et al. | 426/3 |
| 4,954,353 | 9/1990 | Cheruhuri et al. | 426/3 |
| 4,959,225 | 9/1990 | Wans et al. | 426/3 |
| 4,981,698 | 1/1991 | Cherukuri et al. | 426/3 |

*Primary Examiner*—Jeanette Hunter
*Attorney, Agent, or Firm*—Craig M. Bell

[57] ABSTRACT

The present invention pertains to chewing gum compositions having longer lasting sweetness which comprise in percentages by weight of the total composition (a) a soft polyvinyl acetate gum base in an amount from about 50% to about 80%, (b) a flavoring agent, (c) an intense sweetening agent in an amount up to about 0.3%, and (d) a bulk sweetening agent in an amount from about 10% to about 40%. The present invention also pertains to methods for preparing the chewing gums having longer lasting sweetness.

30 Claims, No Drawings

CHEWING GUMS HAVING LONGER LASTING SWEETNESS

BACKGROUND OF THE INVENTION

This application is a continuation-in-part application Ser. No. 291,704, filed Dec. 29, 1988.

1. FILED OF THE INVENTION

This invention pertains to chewing gum compositions having longer lasting sweetness. The chewing gums contain a major amount of a gum base and specific intense sweetening agents or specific combinations of intense sweetening agents together with a bulk sweetening agent. The present invention also pertains to methods for preparing the chewing gums having longer lasting sweetness.

2. DESCRIPTION OF THE PRIOR ART

Reduced-calorie chewing gum compositions are well known in the art. Reduced-calorie chewing gums generally contain about 25% of a water-insoluble gum base, about 40% to about 90% of a bulking agent (filler or texturizing agent), a water-soluble flavoring agent, and water-soluble sweetening agents such as sucrose and corn syrup in sugar gums, and sorbitol, mannitol and intense sweeteners in sugarless gums. The gum base may also contain plasticizers or softeners to improve the consistency and texture of the gum.

In one approach to prepare a reduced-calorie gum, the soluble sugar and sugar alcohol bulking agents are replaced with low calorie alternatives such as inert fillers and texturizing agents. Gums prepared in this manner generally have poor texture because the sugar and sugar alcohol bulking agents not only impart sweetness but also provide a discontinuity to the gum base which results in a softer more pleasant mouth feel.

In another approach to prepare a reduced-calorie gum, a high gum base-low bulking agent chewing gum composition is employed. Because these gums contain a major amount of gum base, these gums generally have poor texture and have a hard, tight, rubbery chew. Furthermore, because the bulk sweetening agent in these gums is present in only minor amounts, these gums generally require intense sweetening agents to be sweet tasting.

Intense sweetening agents (sweeteners) are natural or synthetic compounds which have a greater sweetening intensity, and usually a lower caloric value, than that of sugar (sucrose). Because intense sweeteners have greater sweetening properties than sugar, smaller amounts of the sweeteners provide sweetening intensity equivalent to larger amounts of sugar. Intense sweeteners are well known in the art and are widely used as substitutes for sugar in many low calorie and/or non-cariogenic compositions.

Intense sweeteners have a wide range of chemically distinct structures and hence possess varying properties. These intense sweetener compounds include water-soluble artificial sweeteners such as 1, 2-benzisothiazol-3(2H)-one 1, 1-dioxide (saccharin and its salts), cyclohexylsulfamic acid (cyclamate and its salts), and the potassium salt of 6-methyl-1,2,3-oxathiazin-4(3H)-one-2,2-dioxide (Acesulfame-K, a commercially available product from Hoechst Celanese Corporation, Somerville, N.J.), proteins such as thaumatin (Talin, a commercially available product of Tate & Lyle Products, Reading, United Kingdom), chlorodeoxysugar derivatives (such as Sucralose, a commercially available product of McNeil Specialty Products Company, Skillman, N.J.), and dipeptides such as N-L-alpha-aspartyl-L-phenylalanine 1-methyl ester (Aspartame, a commercially available product of the Nutrasweet Company, Deerfield, Ill.) and L-alpha-aspartyl-D-alanine N-(2,2,4,4-tetramethyl-3-thietanyl)amide (Alitame, a commercially available product of Pfizer, New York, N.Y.), and dihydrochalcones. Each of these sweetening agents has a distinct sweetening intensity compared to sucrose and this sweetening intensity is well documented. For example, the following sweetening agents have the sweetening intensities set out below.

| Sweetness Intensities of Various Sweetening Agents | |
|---|---|
| COMPOUND | SWEETNESS INTENSITY* |
| 1,2-Benzisothiazol-3(2H)-one 1,1-dioxide (Saccharin and its salts) | 300X |
| Cyclohexylsulfamic acid (Cyclamate and its salts) | 30X |
| N-L-alpha-Aspartyl-L-phenylalanine 1-methyl ester (Aspartame) | 180X-200X |
| Potassium salt of 6-methyl-1,2,3-oxathiazin-4(3H)-one-2,2-dioxide (Acesulfame-K) | 200X |
| 4,1',6'-Trichloro-4,1',6'-trideoxy-galactosucrose (Sucralose) | 600X |
| L-alpha-Aspartyl-N-(2,2,4,4-tetramethyl-3-thietanyl)-D-alaninamide hydrate (Alitame) | 2000X |

*Compared to sucrose.

Because each intense sweetening agent is chemically distinct, each sweetener presents a different challenge with respect to the actual use of such sweetener in ingestible compositions. For example, some intense sweeteners present stability problems, such as Aspartame, which exhibits instability in the presence of aldehydes, ketones, moisture, and the like. Other intense sweeteners have an associated bitter taste or off-note such as Saccharin (a commercially available product of PMC Specialty Group Inc., Cincinnati, Ohio), stevioside, Acesulfame-K, glycyrrhizin, dipotassium glycyrrhizin, glycyrrhizic acid ammonium salt, and thaumatin (Talin).

U.S. Pat. No. 4,872,884, issued to Cherukuri et al. and assigned to Warner-Lambert Company, discloses reduced calorie chewing gums wherein soft polyvinyl acetate containing gum bases having an enhanced hydrophilic nature are employed in amounts of greater than about 50% in combination with up to about 0.60% of an intense sweetening agent and up to about 40% of a bulk sweetening agent. The gum bases are employed in major quantities to reduce the caloric content of the gums.

U.S. Pat. No. 4,698,223, issued to Perfetti et al. and assigned to Gum Base Co., SPA, discloses a no-calorie chewing gum composition which comprises from 92% to 99% of a gum base, up to 4% of glycerol, and up to 3% of a flavoring agent. The gum base comprises from 8% to 15% of an elastomer, from 10% to 30% of a hydrogenated or partially hydrogenated animal or vegetable oil, from 10% to 39% of an inert mineral filler, from 8% to 25% of polyvinyl acetate, from 4% to 9% of fatty acid glycerides, from 15% to 25% of resins, from 2% to 6% of natural gum, from 4% to 12% of wax and up to 0.05% of antioxidants.

U.S. Pat. No. 4,435,440, issued to Hough et al. and assigned to Tate and Lyle plc, discloses sweetening agents which comprise chlorodeoxysugar derivatives.

U.S. patent application Ser. No. 230,282, filed Aug. 9, 1988, to Cherukuri et al. and assigned to Warner-Lambert Company, discloses synergistic sweetening compositions which comprise the combination of Sucralose and Aspartame and the combination of Sucralose and Alitame. In general, the synergistic sweetening compositions are employed in a ratio by weight from about 65:35 to about 91.7:8.3, respectively.

U.S. Pat. No. 4,495,170, issued to Beyts et al. and assigned to Tate & Lyle plc, discloses synergistic sweetening compositions which comprise the combination of Sucralose and Saccharin and the combination of Sucralose and Acesulfame-K. In general, the synergistic sweetening compositions are employed in a ratio by weight from about 4:1 to about 1:4, respectively.

U.S. Pat. No. 4,536,396, issued to Stephens, Jr. et al. and assigned to Pfizer Inc., discloses a method for masking the bitter taste, and enhancing the sweet taste, of Acesulfame-K by combining the bitter-tasting intense sweetener with the sweetener Alitame. In general, the synergistic sweetening compositions comprise Acesulfame-K and Alitame in a ratio by weight from about 99.5:0.5 to about 80:20, respectively.

U.S. Pat. No. 3,780,189, issued to Scott and assigned to G. D. Searle & Co., discloses synergistic sweetening compositions which comprise Aspartame and Saccharin in a ratio by weight from about 1 to about 1:5, respectively.

U.S. Pat. No. 4,158,068, issued to Von Rymon Lipinski et al. and assigned to Hoechst Aktiengesellschaft, discloses synergistic sweetening compositions which comprise the combination of Acesulfame-K and Aspartame in a ratio by weight from about 1:10 to about 10:1, respectively, the combination of Acesulfame-K and Cyclamates in a ratio by weight from about 3:1 to about 1:12, respectively, and the combination of Acesulfame-K and Saccharin in a ratio by weight from about 1:2 to about 10:1, respectively.

U.S. patent application Ser. No. 354,651, filed May 19, 1989, to Cherukuri et al. and assigned to Warner-Lambert Company, discloses synergistic sweetening compositions which comprise Alitame and Aspartame employed in a ratio by weight from about 40:60 to about 90:10, respectively.

U.S. Pat. No. 4,375,430, issued to Sklavounos and assigned to Pfizer, Inc., discloses the preparation and purification of certain dipeptide sweetening agents including Alitame.

U.S. Pat. No. 3,943,258, issued to Bahosky and assigned to General Foods Corporation, teaches chewing gums having longer lasting sweetness which comprise a gum base, a flavoring agent, a major amount of a sweet bulking agent, and at least 0.3% of Aspartame. U.S. Pat. No. 3,982,023, also issued to Bahosky and assigned to General Foods Corporation, teaches chewing gums which comprise a gum base, a flavoring agent, a major amount of a sweet bulking agent, and at least 0.1% of Aspartame.

U.S. Pat. No. 4,959,225, to Cherukuri et al. and assigned to Warner-Lambert Company, discloses synergistic sweetening compositions which comprise Sucralose and Maltitol.

PCT patent application serial No. WO 89/03182A, priority date Oct. 6, 1987, to Tate & Lyle plc, discloses synergistic sweetening compositions which comprise Sucralose and a saccharide bulk sweetening agent selected from the group consisting of fructose, glucose, maltose, xylitol, mannitol, and sorbitol.

European Patent Application serial No. 267,809A2, discloses synergistic sweetening compositions which comprise Sucralose and maltodextrin.

U.S. Pat. No. 4,622,233, issued to Torres and assigned to Pfizer, Inc., discloses a tabletop sweetener which comprises Alitame and Polydextrose.

PCT patent application serial No. WO 88/08674A, priority date May 11, 1987, to Staley Continental, Inc., discloses a synergistic sweetening composition which comprises Aspartame and fructose in a ratio by weight from about 1:20 to about 1:1000, respectively.

U.S. Pat. No. 4,820,528, issued to Stroz et al. and assigned to Nabisco Brands, Inc., discloses a codried composition consisting essentially from about 99.9% to about 90% saccharin and from about 0.1% to about 10% of a halodeoxysugar, by weight.

While the above chewing gum compositions provide either a reduced-calorie gum or a gum having longer lasting sweetness, none of the above compositions provides a satisfactory reduced-calorie gum composition which contains a major amount of gum base and has longer lasting sweetness. Accordingly, it would be advantageous to provide such a reduced-calorie chewing gum having longer lasting sweetness without a high filler content and with a soft chew texture. The present invention provides such improved reduced-calorie chewing gums having longer lasting sweetness without the disadvantages characteristic of previously known products. The present invention also provides methods for preparing the improved reduced-calorie chewing gum compositions.

SUMMARY OF THE INVENTION

The present invention pertains to chewing gum compositions having longer lasting sweetness which comprise in percentages by weight of the total composition (a) a soft polyvinyl acetate gum base in an amount from about 50% to about 80%, (b) a flavoring agent, (c) an intense sweetening agent in an amount up to about 0.3%, and (d) a bulk sweetening agent in an amount from about 10% to about 40%. The present invention also pertains to methods for preparing the chewing gums having longer lasting sweetness.

DETAILED DESCRIPTION OF THE INVENTION

The present invention pertains to chewing gum compositions having longer lasting sweetness which comprise in percentages by weight of the total composition (a) a soft polyvinyl acetate gum base in an amount from about 50% to about 80%, (b) a flavoring agent, (c) a synergistic combination of intense sweetening agents in an amount up to about 0.3%, and (d) a bulk sweetening agent in an amount from about 10% to about 40%. The present invention also pertains to methods for preparing the chewing gums having longer lasting sweetness.

Applicants have found that the use of a major amount of gum base in combination with a minor amount of bulk sweetening agent results in unique chewing gum compositions having desirable chew, taste and texture and improved sweetness duration. While not wishing to be bound by theory, applicants believe that the inventive chewing gums have longer lasting sweetness because the higher amounts of soft polyvinyl acetate gum base having an enhanced hydrophilic character serve to retain and more slowly release the intense sweetening agent compared to gum compositions having lower amounts of gum base. By further employing synergistic combinations of intense sweetening agents which are effective in concentrations lower than that of the sum of the individual sweetening agents, applicants can employ even lower concentrations of sweetening agents. Conventional gum bases which do not have an enhanced hydrophilic character tend to bind intense sweetening agents which results in chewing gums having inadequate sweetness. The use of an intense sweetener and a major amount of gum base have an enhanced hydrophilic character results in unique chewing gum compositions possessing longer lasting sweetness despite having only a minor amount of bulk sweetening agent.

The intense sweetening agents of the present invention are sweetening agents which are effective in amounts up to about 0.3%, preferably up to about 0.25%, and more preferably up to about 0.20%, by weight of the chewing gum composition. In a preferred embodiment, the intense sweetening agents are selected from the group consisting of 1, 2-benzisothiazol-3(2H)-one 1, 1-dioxide (Saccharin and its salts), chlorodeoxysugar derivatives (Sucralose), and L-alpha-aspartyl-N-(2,2,4,4-tetramethyl-3-thietanyl)-D-alaninamide hydrate (Alitame), and mixtures thereof. In a more preferred embodiment, the intense sweetening agent is selected from the group consisting of Sucralose, Alitame, and mixtures thereof. In a most preferred embodiment, the intense sweetening agent is Alitame.

In another embodiment, the intense sweetening agent is a synergistic combination of intense sweetening agents which is effective in amounts up to about 0.3%, preferably up to about 0.25%, and more preferably up to about 0.2% by eight of the chewing gum composition. Because of sweetness synergy, synergistic combinations of intense sweetening agents are effective in concentrations lower than that of the sum of the individual sweetening agents. In a preferred embodiment, the synergistic combinations of intense sweetening agents are selected from the group consisting of:

(a) a chlorodeoxysugar derivative (Sucralose) and N-L-alpha-aspartyl-L-phenylalanine 1-methyl ester (Aspartame) present in a ratio by weight from about 65:35 to about 91.7:8.3, respectively;

(b) a chlorodeoxysugar derivative (Sucralose) and L-alpha-aspartyl-N-(2,2,4,4-tetramethyl-3-thietanyl)-D-alaninamide hydrate (Alitame) present in a ratio by weight from about 65:35 to about 91.7:8.3, respectively;

(c) a chlorodeoxysugar derivative (Sucralose) and 1, 2-benzisothiazol-3(2H)-one 1, 1-dioxide (Saccharin and its salts) present in a ratio by weight from about 4:1 to about 1:4, respectively;

(d) a chlorodeoxysugar derivative (Sucralose) and the potassium salt of 6-methyl-1,2,3-oxathiazin-4(3H)-one-2,2-dioxide (Acesulfame-K) present in a ratio by weight from about 4:1 to about 1:4, respectively;

(e) the potassium salt of 6-methyl-1,2,3-oxathiazin-4(3H)-one-2,2-dioxide (Acesulfame-K) and L-alpha-Aspartyl-N-(2,2,4,4-tetramethyl-3-thietanyl)-D-alaninamide hydrate (Alitame) present in a ratio by weight from about 99.5:0.5 to about 80:20, respectively;

(f) N-L-alpha-aspartyl-L-phenylalanine-1-methyl ester (Aspartame) and 1, 2-benzisothiazol-3(2H)-one 1, 1-dioxide (Saccharin and its salts) present in a ratio by weight from about 5:1 to about 1:5, respectively;

(g) the potassium salt of 6-methyl-1,2,3-oxathiazin-4(3H)-one-2,2-dioxide (Acesulfame-K) and N-L-alpha-aspartyl-L-phenylalanine-1-methyl ester (Aspartame) present in a ratio by weight from about 1:10 to about 10:1, respectively;

(h) the potassium salt of 6-methyl-1,2,3-oxathiazin-4(3H)-one-2,2-dioxide (Acesulfame-K) and cyclohexylsulfamic acid (Cyclamate and its salts) present in a ratio by weight from about 3:1 to about 1:12, respectively;

(i) the potassium salt of 6-methyl-1,2,3-oxathiazin-4(3H)-one-2,2-dioxide (Acesulfame-K) and 1, 2-benzisothiazol-3(2H)-one 1, 1-dioxide (Saccharin and its salts) present in a ratio by weight from about 1:2 to about 10:1, respectively; and (k) L-alpha-aspartyl-N-(2,2,4,4-tetramethyl-3-thietanyl)-D-alaninamide hydrate (Alitame) and N-L-alpha-aspartyl-L-phenylalanine 1-methyl ester (Aspartame) present in a ratio by weight from about 40:60 to about 90:10, respectively.

In a more preferred embodiment, the synergistic combinations of intense sweetening agents are selected from the group consisting of:

(a) a chlorodeoxysugar derivative (Sucralose) and N-L-alpha-aspartyl-L-phenylalanine 1-methyl ester (Aspartame) present in a ratio by weight from about 65:35 to about 91.7:8.3, respectively;

(b) a chlorodeoxysugar derivative (Sucralose) and L-alpha-aspartyl-N-(2,2,4,4-tetramethyl-3-thietanyl)-D-alaninamide hydrate (Alitame) present in a ratio by weight from about 65:35 to about 91.7:8.3, respectively;

(c) a chlorodeoxysugar derivative (Sucralose) and 1, 2-benzisothiazol-3(2H)-one 1, 1-dioxide (Saccharin and its salts) present in a ratio by weight from about 4:1 to about 1:4, respectively;

(d) a chlorodeoxysugar derivative (Sucralose) and the potassium salt of 6-methyl-1,2,3-oxathiazin-4(3H)-one-2,2-dioxide (Acesulfame-K) present in a ratio by weight from about 4:1 to about 1:4, respectively;

(e) the potassium salt of 6-methyl-1,2,3-oxathiazin-4(3H)-one-2,2-dioxide (Acesulfame-K) and L-alpha-Aspartyl-N-(2,2,4,4-tetramethyl-3-thietanyl)-D-alaninamide hydrate (Alitame) present in a ratio by weight from about 99.5:0.5 to about 80:20, respectively;

(f) N-L-alpha-aspartyl-L-phenylalanine-1-methyl ester (Aspartame) and 1, 2-benzisothiazol-3(2H)-one 1, 1-dioxide (Saccharin and its salts) present in a ratio by weight from about 5:1 to about 1:5, respectively;

(g) the potassium salt of 6-methyl-1,2,3-oxathiazin-4(3H)-one-2,2-dioxide (Acesulfame-K) and 1, 2-benzisothiazol-3(2H)-one 1, 1-dioxide (Saccharin and its salts) present in a ratio by weight from about 1:2 to about 10:1, respectively; and (h) L-alpha-aspartyl-N-(2,2,4,4-tetramethyl-3-thietanyl)-D-alaninamide hydrate (Alitame) and N-L-alpha-aspartyl-L-phenylalanine 1-methyl ester (Aspartame) present in a ratio by weight from about 40:60 to about 90:10, respectively.

In a most preferred embodiment, the synergistic combinations of intense sweetening agents are selected from the group consisting of:

(a) a chlorodeoxysugar derivative (Sucralose) and L-alpha-aspartyl-N-(2,2,4,4-tetramethyl-3-thietanyl)-D-alaninamide hydrate (Alitame) present in a ratio by weight from about 65:35 to about 91.7:8.3, respectively; and (b) a chlorodeoxysugar derivative (Sucralose) and 1, 2-benzisothiazol-3(2H)-one 1, 1-dioxide (Saccharin and its salts) present in a ratio by weight from about 4:1 to about 1:4, respectively.

In yet another embodiment, the intense sweetening agent and the bulking agent are a synergistic combination of sweetening agents wherein the intense sweetening agent in the synergistic combination is effective in amounts up to about 0.3%, preferably up to about 0.25%, and more preferably up to about 0.2%, by weight of the chewing gum composition. As set out above, synergistic combinations of sweetening agents are effective in concentrations lower than that of the sum of the individual sweetening agents because of sweetness synergy. In a preferred embodiment, the synergistic combinations of sweetening agents are selected from the group consisting of:

(a) a chlorodeoxysugar derivative (Sucralose) and maltitol;

(b) a chlorodeoxysugar derivative (Sucralose) and a bulk sweetening agent selected from the group consisting of fructose, glucose, maltose, xylitol, mannitol, and sorbitol;

(c) a chlorodeoxysugar derivative (Sucralose) and maltodextrin;

(d) L-alpha-aspartyl-N-(2,2,4,4-tetramethyl-3-thietanyl)-D-alaninamide hydrate (Alitame) and Polydextrose; and (e) N-L-alpha-aspartyl-L-phenylalanine 1-methyl ester (Aspartame) and fructose.

In a more preferred embodiment, the synergistic combinations of sweetening agents are selected from the group consisting of:

(a) a chlorodeoxysugar derivative (Sucralose) and maltitol;

(b) a chlorodeoxysugar derivative (Sucralose) and a bulk sweetening agent selected from the group consisting of fructose, glucose, maltose, xylitol, mannitol, and sorbitol;

(c) a chlorodeoxysugar derivative (Sucralose) and maltodextrin; and (d) L-alpha-aspartyl-N-(2,2,4,4-tetramethyl-3-thietanyl)-D-alaninamide hydrate (Alitame) and Polydextrose.

In a most preferred embodiment, the synergistic combination of sweetening agents is L-alpha-aspartyl-N-(2,2,4,4-tetramethyl-3-thietanyl)-D-alaninamide hydrate (Alitame) and Polydextrose.

The chlorodeoxysugar derivatives in the present invention may be selected from the group consisting of chlorodeoxysucrose derivatives, chlorodeoxygalactosucrose derivatives, and mixtures thereof. In a preferred embodiment, the chlorodeoxysucrose and chlorodeoxygalactosucrose derivatives are selected from the group consisting of:

(a) 1-chloro-1'-deoxysucrose;

(b) 4-chloro-4-deoxy-alpha-D-galactopyranosylalpha-D-fructofuranoside, or 4-chloro-4-deoxygalactosucrose;

(c) 4-chloro-4-deoxy-alpha-D-galactopyranosyl-1-chloro-1-deoxy-beta-D-fructofuranoside, or 4,1'-dichloro-4,1'-dideoxygalactosucrose;

(d) 1',6'-dichloro-1',6'-dideoxysucrose;

(e) 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose;

(f) 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose;

(g) 6,1',6'-trichloro-6,1',6'-trideoxysucrose;

(h) 4,6-dichloro-4,6-dideoxy-alpha-D-galactopyranosyl-1,6-dichloro-1,6-dideoxy-beta-D-fructofuranoside, or 4,6,1',6'-tetrachloro-4,6,1',6'-tetradeoxygalactosucrose; and (i) 4,6,1',6'-tetrachloro-4,6,1',6'-tetradeoxysucrose.

In a preferred embodiment, the chlorodeoxysugar derivative is 4,1',6'-trichloro-4,1',6'-trideoxygalactosucrose (4-chloro-4-deoxy-alpha-D-galactopyranosyl-1,6-dichloro-1,6-dideoxy-beta-D-fructofuranoside) which is commercially available under the tradename Sucralose from McNeil Specialty Products Company; Skillman, N.J.

Synergistic sweetening compositions which comprise the combination of Sucralose and Aspartame, or the combination of Sucralose and Alitame, are generally effective in a ratio by weight from about 65:35 to about 91.7:8.3, respectively. Such synergistic sweetening compositions are disclosed in detail in U.S. patent application Ser. No. 230,282, filed Aug. 9, 1988, to Cherukuri et al. and assigned to Warner-Lambert Company, which disclosure is incorporated herein by reference.

Synergistic sweetening compositions which comprise the combination of Sucralose and Saccharin, or the combination of Sucralose and Acesulfame-K, are effective in a ratio by weight from about 4:1 to about 1:4, respectively. Such synergistic sweetening compositions are described in detail in U.S. Pat. No. 4,495,170, which disclosure is incorporated herein by reference.

Synergistic sweetening compositions which comprise Acesulfame-K and Alitame are effective in a ratio by weight from about 99.5:0.5 to about 80:20, respectively, and are disclosed in detail in U.S. Pat. No. 4,536,396, which disclosure is incorporated herein by reference.

Synergistic sweetening compositions which comprise Aspartame and Saccharin are effective in a ratio by weight from about 5:1 to about 1:5, respectively, and are disclosed in detail in U.S. Pat. No. 3,780,189, which disclosure is incorporated herein by reference.

Synergistic sweetening compositions which comprise Acesulfame-K and Aspartame are effective in a ratio by weight from about 1:10 to about 10:1, respectively. Synergistic sweetening compositions which comprise Acesulfame-K and Cyclamates are effective in a ratio by weight from about 3:1 to about 1:12, respectively. Synergistic sweetening compositions which comprise Acesulfame-K and Saccharin are effective in a ratio by weight from about 1:2 to about 10:1, respectively. Such synergistic sweetening compositions are disclosed in detail in U.S. Pat. No. 4,158,068, which disclosure is incorporated herein by reference.

Synergistic sweetening composition which comprise Alitame and Aspartame are effective in a ratio by weight from about 40:60 to about 90:10, respectively, and are disclosed in detail in U.S. patent application Ser. No. 354,651, filed May 19, 1989, which disclosure is incorporated herein by reference.

Synergistic sweetening compositions which comprise Sucralose and Maltitol are described in detail in U.S. patent application Ser. No. 264,248, filed Oct. 28, 1988, which disclosure is incorporated herein by reference.

Synergistic sweetening compositions which comprise Sucralose and a saccharide bulk sweetening agent selected from the group consisting of fructose, glucose, maltose, xylitol, mannitol, and sorbitol are described in detail in PCT patent application serial No. WO 89/03182A, priority date Oct. 6, 1987, which disclosure is incorporated herein by reference.

Synergistic sweetening compositions which comprise Sucralose and maltodextrin are described in detail in European Patent Application serial No. 267,809A2, which disclosure is incorporated herein by reference.

Sweetening compositions which comprise Alitame and Polydextrose are described in detail in U.S. Pat. No. 4,622,233, which disclosure is incorporated herein by reference.

Synergistic sweetening compositions which comprise Aspartame and fructose are effective in a ratio by weight from about 1:20 to about 1:1000, respectively, and are described in detail in PCT patent application serial No. WO 88/08674A, priority date May 11, 1987, which disclosure is incorporated herein by reference.

The intense sweetening agents of the present invention may be used in many distinct physical forms well known in the art to provide an initial burst of sweetness and/or a prolonged sensation of sweetness. Without being limited thereto, such physical forms include free forms, such as spray dried, powdered, and beaded forms, and encapsulated forms, and mixtures thereof.

The synergistic sweetening compositions are prepared by admixing the sweetening agents.

The combination of the sweeteners set out above results in a synergistic sweetening composition having an enhanced sweetness effect in chewing gum compositions. The sweetening intensity effect is markedly greater than that expected by mere combination of the sweetening agents. Accordingly, the synergistic sweetening compositions have the advantage of requiring lower amounts of sweetener to adequately sweeten a chewing gum composition. The specific intense sweetening agents and the specific combinations of sweetening agents set out above in combination with a minor amount of a bulk sweetening agent unexpectedly provides a chewing gum composition having longer lasting sweetness.

An important aspect of the present invention includes an improved chewing gum composition incorporating the synergistic sweetening compositions and a method for preparing the chewing gum composition, including both chewing gum and bubble gum formulations. In general, the improved chewing gum compositions will contain a gum base, an effective amount of the inventive synergistic sweetening composition, and various additives.

The chewing gum compositions are reduced-calorie chewing gums employing high levels of a chewing gum base having an enhanced hydrophilic character. These reduced-calorie chewing gums will comprise a gum base present in an amount from about 50% to about 80%, preferably from about 50% to about 70%, and more preferably from about 60% to about 70%, by weight of the chewing gum composition.

As used herein, the term "reduced-calorie composition" means a composition having a caloric value two thirds or less than that of a conventional composition. The term "tight" or "rubbery" chew refers to a chewing gum composition which requires a large amount of muscular chewing effort to masticate or to a composition which provides a gum bolus with high elasticity and bounce and which is difficult to deform.

Gum bases having an enhanced hydrophilic character include polyvinyl acetate gum bases which may also contain a low melting point wax. Such gum bases do not require a high level of bulking agent to plasticize the gum base and render it soft during chewing. These gum bases may be used at higher than normal levels in chewing gum compositions in place of a bulking and/or a bulk sweetening agent to prepare high base-low bulking agent reduced-calorie gums which do not have rubbery or tight chew characteristics. These gum bases possess increased hydrophilic properties over conventional gum bases and appear to increase in size during chewing releasing flavoring and sweetening agents which would normally be entrapped in the gum base while maintaining a soft chew texture. Reduced-calorie chewing gum compositions prepared with such gum bases in high levels are less hygroscopic (have lower moisture-pickup) and are less prone to becoming stale than conventional reduced-calorie gum compositions while having comparable firmness and texture.

The elastomers (rubbers) employed in the gum base of the present invention will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and mixtures thereof. Examples of synthetic elastomers include, without limitation, styrene-butadiene copolymers (SBR), polyisobutylene, isobutylene-isoprene copolymers, polyethylene, and the like, and mixtures thereof.

The amount of elastomer employed in the gum base will vary greatly depending upon various factors such as the type of gum base used, the consistency of the gum composition desired and the other components used in the composition to make the final chewing gum product. In general, the elastomer will be present in the gum base in an amount from about 0.5% to about 20%, and preferably from about 2.5% to about 15%, by weight of the gum base.

The polyvinyl acetate polymer employed in the gum base of the present invention is a polyvinyl acetate polymer having a medium molecular weight, specifically, having a mean average molecular weight in the range from about 35,000 to about 55,000. This medium molecular weight polyvinyl acetate polymer will preferably have a viscosity from about 35 seconds to about 55 seconds (ASTM designation D1200-82 using a Ford cup viscometer procedure). The medium molecular weight polyvinyl acetate polymer will be present in the gum base in an amount from about 10% to about 25%, and preferably from about 12% to about 27%, by weight of the gum base.

The medium molecular weight polyvinyl acetate polymer may also be blended with a low molecular weight polyvinyl acetate polymer. The low molecular weight polyvinyl acetate polymer will have a mean average molecular weight in the range from about 12,000 to about 16,000. This low molecular weight polyvinyl acetate polymer will preferably have a viscosity from about 14 seconds to about 16 seconds (ASTM designation D1200-82 using a Ford cup viscometer procedure). The low molecular weight polyvinyl acetate polymer will be present in the gum base in an amount up about 17%, and preferably from about 12% to about 17%, by weight of the gum base.

When a low molecular weight polyvinyl acetate polymer is blended with a medium molecular weight polyvinyl acetate polymer, the polymers will be present in a mole ratio from about 1:0.5 to about 1:1.5, respectively.

The medium molecular weight polyvinyl acetate polymer may also be blended with a high molecular weight polyvinyl acetate polymer. The high molecular weight polyvinyl acetate polymer will have a mean average molecular weight in the range from about 65,000 to about 95,000. The high molecular weight polyvinyl acetate polymer will be present in the gum base in an amount up to about 5%, by weight of the gum base.

The acetylated monoglycerides in the present invention, like the polyvinyl acetate polymer, serve as plasticizing agents. While the saponification value of the acetylated monoglycerides is not critical, preferable saponification values are 278 to 292, 316 to 331, 370 to 380, and 430 to 470. A particularly preferred acetylated monoglyceride has a saponification value above about 400. Such acetylated monoglycerides generally have an acetylation value (percentage acetylated) above about 90 and a hydroxyl value below about 10 (Food Chemical Codex (FCC) III/P508 and the revision of AOCS).

The use of acetylated monoglycerides in the present gum base is preferred over the use of bitter polyvinyl acetate (PVA) plasticizers, in particular, triacetin. The acetylated monoglycerides will be present in the gum base in an amount from about 4.5% to about 10%, and preferably from about 5% to about 9%, by weight of the gum base.

The wax in the gum base of the present invention softens the polymeric elastomer mixture and improves the elasticity of the gum base. The waxes employed will have a melting point below about 60° C., and preferably between about 45° C. and about 55° C. A preferred wax is low melting paraffin wax. The wax will be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnauba wax, most petroleum waxes, and the like, and mixtures thereof.

In addition to the components set out above, the gum base includes a variety of traditional ingredients, such as a component selected from the group consisting of elastomer solvents, emulsifiers, plasticizers, fillers, and mixtures thereof. These ingredients are present in the gum base in an amount to bring the total amount of gum base to 100%.

The gum base may contain elastomer solvents to aid in softening the elastomer component. Such elastomer solvents may comprise those elastomer solvents known in the art, for example, terpinene resins such as polymers of alpha-pinene or beta-pinene, methyl, glycerol and pentaerythritol esters of rosins and modified rosins and gums, such as hydrogenated, dimerized and polymerized rosins, and mixtures thereof. Examples of elastomer solvents suitable for use herein include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stable system. The emulsifiers useful in this invention include glyceryl monostearate, lecithin, fatty acid monoglycerides, diglycerides, propylene glycol monostearate, and the like, and mixtures thereof. A preferred emulsifier is glyceryl monostearate. The emulsifier may be employed in amounts from about 2% to about 15%, and preferably from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20%, and preferably in amounts from about 9% to about 17%, by weight of the gum base.

Preferred plasticizers are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 14%, and preferably in amounts from about 5% to about 13.5%, by weight of the gum base.

In another preferred embodiment, the softening agent is anhydrous glycerin, such as the commercially available United States Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

The gum base of this invention may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, and the like, and mixtures thereof. These fillers or adjuvants may be used in the gum base compositions in various amounts. Preferably the amount of filler, when used, will be present in an amount from about 15% to about 40%, and preferably from about 20% to about 30%, by weight of the gum base.

A variety of traditional ingredients may be optionally included in the gum base in effective amounts such as coloring agents, antioxidants, preservatives, flavoring agents, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base.

In one embodiment, the invention pertains to a reduced-calorie chewing gum composition which comprises a gum base present in an amount from about 40% to about 75%, by weight of the chewing gum composition, which comprises (a) an elastomer present in an amount from about 0.5% to about 20%, by weight of the gum base, (b) a medium molecular weight polyvinyl acetate polymer having a molecular weight from about 35,000 to about 55,000 present in an amount from about 10% to about 25%, by weight of the gum base, (c) n acetylated monoglyceride present in an amount from about 4.5% to about 10%, by weight of the gum base, (d) a wax having a melting point below about 60° C. present in an amount from about 6% to about 10%, by weight of the gum base, and (e) a material selected from the group consisting of elastomer solvents, emulsifiers, plasticizers, fillers, and mixtures thereof, present in an amount to bring the total amount of gum base to 100%, by weight of the gum base.

The manner in which the gum base components are admixed is not critical and is performed using standard techniques and apparatus known to those skilled in the art. In a typical method, an elastomer is admixed with an elastomer solvent and/or a plasticizer and/or an emulsifier and agitated for a period of from 1 to 30 minutes. After blending is complete, the polyvinyl acetate component is admixed into the mixture. The medium molecular weight polyvinyl acetate is preferably admixed prior to addition of the optional low molecular weight polyvinyl acetate to prevent the creation of pockets of polyvinyl acetate within the elastomer mixture. The remaining ingredients, such as the low melting point wax, are then admixed, either in bulk or incrementally, while the gum base mixture is blended again for 1 to 30 minutes.

Chewing gum compositions employing a high level of a chewing gum base having an enhanced hydrophilic character are more fully described in U.S. Pat. No. 4,872,884, which disclosure is incorporated herein by reference.

Other gum bases having an enhanced hydrophilic nature and suitable for use in reduced-calorie chewing gum compositions in high levels may also be employed in the present invention. In general, these gum bases may be employed in amounts from about 50% to about 80%, preferably from about 50% to about 70%, and more preferably from about 60% to about 70%, by weight of the chewing gum composition. Suitable gum bases having an enhanced hydrophilic nature include, for example, those disclosed in U.S. Pat. No. 4,698,223, which disclosure is incorporated herein by reference. The gum base is formulated with the synergistic sweetening compositions and conventional additives such as a bulking agent to prepare a wide variety of sweetened chewing gum compositions.

The amount of gum base employed in the chewing gum composition will vary depending on such factors as the type of gum base used, the consistency desired, and the other components used to make the final chewing gum product. In general, the gum base having an enhanced hydrophilic character will be present in the chewing gum composition in an amount from about 50% to about 80%, preferably from about 50% to about 70%, and more preferably from about 60% to about 70%, by weight of the chewing gum composition.

Once prepared, the gum base may be formulated with the intense sweetening agents and combination of sweetening agents of the present invention and conventional additives such as a bulking agent to prepare a wide variety of chewing gum compositions.

In addition to the chewing gum base, the chewing gum composition includes a bulking agent. The bulking agents (carriers, extenders), in the present invention may be water-soluble and include sweetening agents selected from the group consisting of, but not limited to, monosaccharides, disaccharides, polysaccharides, sugar alcohols, and mixtures thereof; randomly bonded glucose polymers such as those polymers distributed under the tradename Polydextrose by Pfizer, Inc., Groton, Conn.; isomalt (a racemic mixture of alpha-D-glucopyranosyl-1,6-mannitol and alpha-D-glucopyranosyl-1,6-sorbitol manufactured under the tradename Palatinit by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate, celluloses and the and the like, and mixtures thereof. Bulking agents may be used in amounts up to about 40%, and preferably in amounts from about 15% to about 40%, by weight of the chewing gum composition.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. Mixtures of sucrose and corn syrup solids are the preferred sugar bulking agents.

Suitable sugar alcohol bulking agents include sorbitol, xylitol, mannitol, galactitol, maltitol, and mixtures thereof. Mixtures of sorbitol and mannitol are the preferred sugar alcohol bulking agents.

Maltitol is a sweet, non-caloric, water-soluble sugar alcohol useful as a bulking agent in the preparation of non-caloric beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

The gum composition may include effective amounts of conventional additives selected from the group consisting of plasticizers, softeners, emulsifiers, waxes, fillers, mineral adjuvants, flavoring agents (flavors, flavorings), coloring agents (colorants, colorings), antioxidants, acidulants, thickening agents, and the like, and mixtures thereof. These ingredients are present in the chewing gum composition in an amount to bring the total amount of chewing gum composition to 100%. Some of these additives may serve more than one purpose. For example, in sugarless gum compositions, a sweetening agent, such as sorbitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickening agents, used alone or in combination with other softeners, such as methyl cellulose, alginates, carrageenan, xanthan gum, gelatin, carob, tragacanth, and locust bean, acidulants such as malic acid, adipic acid, citric acid, tartaric acid, fumaric acid, and mixtures thereof, and fillers, such as those discussed above under the category of mineral adjuvants.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in *Chemicals Used in Food Processing* publication 1274, pages 63-258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, mixtures thereof and the like.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

Encapsulated delivery systems for flavoring agents or sweetening agents comprise a hydrophobic matrix of fat or wax surrounding a sweetening agent or flavoring agent core. The fats may be selected from any number of conventional materials such as fatty acids, glycerides or polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil, and mixtures thereof. Glycerides which are useful include monoglycerides, diglycerides, and triglycerides.

Waxes useful may be chosen from the group consisting of natural and synthetic waxes, and mixtures thereof. Non-limiting examples include paraffin wax, petrolatum, carbowax, microcrystalline wax, beeswax, carnauba wax, candellila wax, lanolin, bayberry wax, sugarcane wax, spermaceti wax, rice bran wax, and mixtures thereof.

The fats and waxes may be use individually or in combination in amounts varying from about 10 to about 70%, and preferably in amounts from about 40 to about 58%, by weight of the encapsulated system. When used in combination, the fat and wax are preferably present in a ratio from about 70:10 to 85:15, respectively.

Typical encapsulated flavoring agent or sweetening agent delivery systems are disclosed in U.S. Pat Nos. 4,597,970 and 4,722,845, which disclosures are incorporated herein by reference.

The amount of flavoring agent employed herein is normally a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, and preferably from about 0.1% to about 2%, and more preferably, from about 0.8% to about 1.8%, by weight of the chewing gum composition.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No.1 comprises a triphenylmethane dye and is the monosodium salt of 4-[4-(N-ethyl-p-sulfoniumbenzylamino) diphenylmethylene]-[1-(N-ethyl -N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857–884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7%, and preferably up to about 3.5%, by weight of the gum composition.

As set out above, the intense sweetening agents in the present invention are selected from the group consisting of 1, 2-benzisothiazol-3(2H)-one 1, 1-dioxide (Saccharin and its salts), chlorodeoxysugar derivatives (Sucralose), and L-alpha-aspartyl-N-(2,2,4,4-tetramethyl-3-thietanyl)-D-alaninamide hydrate (Alitame), and mixtures thereof. The intense sweetening agents which are synergistic combinations of intense sweetening agents are selected from the group consisting of:

(a) a chlorodeoxysugar derivative (Sucralose) and N-L-alpha-aspartyl-L-phenylalanine 1-methyl ester (Aspartame);

(b) a chlorodeoxysugar derivative (Sucralose) and L-alpha-aspartyl-N-(2,2,4,4-tetramethyl-3-thietanyl)-D-alaninamide hydrate (Alitame);

(c) a chlorodeoxysugar derivative (Sucralose) and 1, 2-benzisothiazol-3(2H)-one 1, 1-dioxide (Saccharin and its salts):

(d) a chlorodeoxysugar derivative (Sucralose) and the potassium salt of 6-methyl-1,2,3-oxathiazin-4(3H)-one-2,2-dioxide (Acesulfame-K);

(e) the potassium salt of 6-methyl-1,2,3-oxathiazin-4(3H)-one-2,2-dioxide (Acesulfame-K) and L-alpha-Aspartyl-N-(2,2,4,4-tetramethyl-3-thietanyl)-D-alaninamide hydrate (Alitame);

(f) N-L-alpha-aspartyl-L-phenylalanine-1-methyl ester (Aspartame) and 1, 2-benzisothiazol-3(2H)-one 1, 1-dioxide (Saccharin and its salts);

(g) the potassium salt of 6-methyl-1,2,3-oxathiazin-4(3H)-one-2,2-dioxide (Acesulfame-K) and N-L-alpha-aspartyl-L-phenylalanine-1-methyl ester (Aspartame);

(h) the potassium salt of 6-methyl-1,2,3-oxathiazin-4(3H)-one-2,2-dioxide (Acesulfame-K) and cyclohexylsulfamic acid (Cyclamate and its salts);

(i) the potassium salt of 6-methyl-1,2,3-oxathiazin-4(3H)-one-2,2-dioxide (Acesulfame-K) and 1, 2-benzisothiazol-3(2H)-one 1, 1-dioxide (Saccharin and its salts); and (k) L-alpha-aspartyl-N-(2,2,4,4-tetramethyl-3-thietanyl)-D-alaninamide hydrate (Alitame) and N-L-alpha-aspartyl-L-phenylalanine 1-methyl ester (Aspartame).

The sweetening agents which are synergistic combinations of an intense sweetening agent and a bulking agent are selected from the group consisting of:

(a) a chlorodeoxysugar derivative (Sucralose) and maltitol;

(b) a chlorodeoxysugar derivative (Sucralose) and a bulk sweetening agent selected from the group consisting of fructose, glucose, maltose, xylitol, mannitol, and sorbitol;

(c) a chlorodeoxysugar derivative (Sucralose) and maltodextrin;

(d) L-alpha-aspartyl-N-(2,2,4,4-tetramethyl-3-thietanyl)-D-alaninamide hydrate (Alitame) and Polydextrose; and (e) N-L-alpha-aspartyl-L-phenylalanine 1-methyl ester (Aspartame) and fructose.

In accordance with this invention, effective amounts of the intense sweetening agents of the present invention may be admixed into the chewing gum composition. The exact amount of intense sweetening agent employed is normally a matter of preference subject to such factors as the particular type of gum composition being prepared, the type of bulking agent or carrier employed, the type of flavor employed and the intensity of sweetness desired. Thus, the amount of intense sweetening agent may be varied in order to obtain the result desired in the final product and such variations are within the capabilities of those skilled in the art without the need for undue experimentation. In general, the amount of intense sweetening agent normally present in a chewing gum composition will be up to about 0.3%, preferably up to about 0.25%, and more preferably up to about 0.20%, by weight of the chewing gum composition.

The present invention also includes a method for preparing the improved chewing gum compositions, including both chewing gum and bubble gum formulations. The chewing gum compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan.

In such a method, a chewing gum composition is made by admixing the gum base with the synergistic sweetening composition and the other ingredients of the final desired chewing gum composition. Other ingredients will usually be incorporated into the composition as dictated by the nature of the desired composition as well known by those having ordinary skill in the art. The ultimate chewing gum compositions are readily prepared using methods generally known in the food technology and chewing gum arts.

Fore example, the gum base is heated to a temperature sufficiently high to soften the base without adversely effecting the physical and chemical make up of the base. The optimal temperatures utilized may vary depending upon the composition of the gum base used, but such temperatures are readily determined by those skilled in the art without undue experimentation.

The gum base is conventionally melted at temperatures that range from about 60° C. to about 120° C. for a period of time sufficient to render the base molten. For example, the gum base may be heated under these conditions for a period of about thirty minutes just prior to being admixed incrementally with the remaining ingredients of the gum composition such as the sweetening agent composition, plasticizer, the softener, the bulking agent, and/or fillers, coloring agents and flavoring agents, and/or fillers, coloring agents and flavoring agents to plasticize the blend as well as to modulate the hardness, viscoelasticity and formability of the base. In general, the melted gum base will be admixed with about two thirds (⅔) to three quarters (¾) of the sweetening ingredients for a period of one to eight minutes. The optional ingredients are then admixed followed by the remaining sweetening ingredients. Mixing is continued until a uniform mixture of gum composition is obtained. Thereafter the gum composition mixture may be formed into desirable chewing gum shapes.

The present invention is further illustrated by the following examples which are not intended to limit the effective scope of the claims. All parts and percentages in the examples and throughout the specification and claims are by weight of the final composition unless otherwise specified.

EXAMPLES 1-9

These Examples demonstrate the longer lasting sweetness effect of the chewing gums of the present invention. Aspartame, Sucralose, Acesulfame-K, Saccharin, and Alitame were combined to formulate the test chewing gum compositions of Examples 1-9 set out in Tables 1—3. The chewing gums were prepared by conventional chewing gum manufacturing techniques.

TABLE 1

SWEETENING AGENT COMBINATIONS IN CHEWING GUM COMPOSITIONS

| Ingredient | EXAMPLES (Percent by Weight) | | |
|---|---|---|---|
| | 1 | 2 | 3 |
| Gum base | 68 | 68 | 68 |
| Bulk Sweetening Agent | 24 | 24.14 | 24.524 |
| Softening Agent | 5.2 | 5.2 | 5.2 |
| Flavoring Agent | 2.1 | 2.1 | 2.1 |
| Aspartame | 0.700 | 0.112 | 0.112 |
| Sucralose | — | — | 0.064 |
| Acesulfame-K | — | 0.448 | — |

TABLE 2

SWEETENING AGENT COMBINATIONS IN CHEWING GUM COMPOSITIONS

| Ingredient | EXAMPLES (Percent by Weight) | | |
|---|---|---|---|
| | 4 | 5 | 6 |
| Gum base | 68 | 68 | 68 |
| Bulk Sweetening Agent | 24.524 | 24.46 | 24.4804 |
| Softening Agent | 5.2 | 5.2 | 5.2 |
| Flavoring Agent | 2.1 | 2.1 | 2.1 |
| Aspartame | 0.112 | 0.156 | — |
| Sucralose | 0.064 | — | — |
| Acesulfame-K | — | 0.084 | — |
| Saccharin | — | — | 0.0396 |

TABLE 3

SWEETENING AGENT COMBINATIONS IN CHEWING GUM COMPOSITIONS

| Ingredient | EXAMPLES (Percent by Weight) | | |
|---|---|---|---|
| | 7 | 8 | 9 |
| Gum base | 68 | 68 | 68 |
| Bulk Sweetening Agent | 24.625 | 24.5938 | 24.6805 |
| Softening Agent | 5.2 | 5.2 | 5.2 |
| Flavoring Agent | 2.1 | 2.1 | 2.1 |
| Aspartame | — | 0.875 | — |
| Sucralose | 0.075 | — | 0.0105 |
| Acesulfame-K | — | — | — |
| Saccharin | — | — | — |
| Alitame | — | 0.0187 | 0.009 |

An expert sensory chew panel having experience in the organoleptic evaluation of ingestible products, including chewing gums, evaluated the relative sweetening intensity of the chewing gum compositions of Examples 1-9, inclusive, at 30 seconds, 2 minutes, 6 minutes and 10 minutes (on a scale of 0-100, 0 being not sweet, and 100 being very sweet) in random order and the findings were pooled and averaged.

The chewing gum compositions of Examples 1-3 were judges to have good sweetness duration and were evaluated to have substantially the same sweetness intensity over time. The chewing gum compositions of Examples 4-9, which had very low levels of intense sweetening agents, were judged to have good sweetness duration.

The invention being thus described, it will be obvious that the same may be varied in many ways. Such variations are not to be regarded as a departure from the spirit and scope of the invention and all such modifications are intended to be included within the scope of the following claims.

We claim:

1. A chewing gum composition having longer lasting sweetness which comprises in percentages by weight of the total composition:
   (a) a soft polyvinyl acetate gum base in an amount from about 60% to about 70%;
   (b) a flavoring agent;
   (c) an intense sweetening agent in an amount up to about 0.3%; and
   (d) a bulk sweetening agent in an amount from about 10% to about 40%.

2. The chewing gum composition according to claim 1, wherein the intense sweetening agent is selected from the group consisting of 1,2-benzisothiazol-3(2H)-one 1, 1-dioxide (Saccharin and its salts), chlorodeoxysugar derivatives, and L-alpha-aspartyl-N-(2,2,4,4-tetramethyl-3-thietanyl)-D-alaninamdie hydrate (Alitame), and mixtures thereof.

3. The chewing gum composition according to claim 2, wherein the intense sweetening agent is selected from the group consisting of chlorodeoxysugar derivatives, L-alpha-aspartyl-N-(2,2,4,4-tetramethyl-3-thietanyl)-D-alaninamide hydrate (Alitame), and mixtures thereof.

4. The chewing gum composition according to claim 1, wherein the intense sweetening agent is a synergistic combination of intense sweetening agents.

5. The chewing gum composition according to claim 4, wherein the intense sweetening agent is a synergistic combination of intense sweetening agents comprising a chlorodeoxysugar derivative and N-L-alpha-aspartyl-L-phenylalanine 1-methyl ester (Aspartame) present in a ratio by weight from about 65:35 to about 91.7:8.3, respectively.

6. The chewing gum composition according to claim 4, wherein the intense sweetening agent is a synergistic combination of intense sweetening agents comprising a chlorodeoxysugar derivative and L-alpha-aspartyl-N-(2,2,4,4-tetramethyl-3-thietanyl)-D-alaninamide hydrate (Alitame) present in a ratio by weight from about 65.35 to about 91.7:8.3, respectively.

7. The chewing gum composition according to claim 4, wherein the intense sweetening agent is a synergistic combination of intense sweetening agents comprising a chlorodeoxysugar derivative and 1,2-benzisothiazol-3(2H)-one 1, 1-dioxide (Saccharin and its salts) present in a ratio by weight from about 4:1 to about 1:4, respectively.

8. The chewing gum composition according to claim 4, wherein the intense sweetening agent is a synergistic combination of intense sweetening agents comprising a chlorodeoxysugar derivative and the potassium salt of 6-methyl-1,2,3-oxathiazin-4(3H)-one-2,2-dioxide (Acesulfame-K) present in a ratio by weight from about 4:1 to about 1:4, respectively.

9. The chewing gum composition according to claim 4, wherein the intense sweetening agent is a synergistic combination of intense sweetening agents comprising the potassium salt of 6-methyl-1,2,3-oxathiazin-4(3H)-one-2,2-dioxide (Acesulfame-K) and L-alpha-aspartyl-N-(2,2,4,4-tetramethyl-3-thietanyl)-D-alaninamide hydrate (Alitame) present in a ratio by weight from about 99.5:0.5 to about 80:20, respectively.

10. The chewing gum composition according to claim 4, wherein the intense sweetening agent is a synergistic combination of intense sweetening agents comprising N-L-alpha-aspartyl-L-phenylalanine-1-methyl ester (Aspartame) and 1, 2-benzisothiazol-3(2H)-one 1, 1-dioxide (Saccharin and its salts) present in a ratio by weight from about 5:1 to about 1:5, respectively.

11. The chewing gum composition according to claim 4, wherein the intense sweetening agent is a synergistic combination of intense sweetening agents comprising the potassium salt of 6-methyl-1,2,3-oxathiazin-4(3H)-one-2,2-dioxide (Acesulfame-K) and N-L-alpha-aspartyl-L-phenylalanine-1-methyl ester (Aspartame) present in a ratio by weight from about 1:10 to about 10:1, respectively.

12. The chewing gum composition according to claim 4, wherein the intense sweetening agent is a synergistic combination of intense sweetening agents comprising the potassium salt of 6-methyl-1,2,3-oxathiazin-4(3H)-one-2,2-dioxide (Acesulfame-K) and cyclohexylsulfamic acid (Cyclamate and its salts) present in a ratio by weight from about 3:1 to about 1:12, respectively.

13. The chewing gum composition according to claim 4, wherein the intense sweetening agent is a synergistic combination of intense sweetening agents comprising the potassium salt of 6-methyl-1,2,3-oxathiazin-4(3H)-one-2,2-dioxide (Acesulfame-K) and 1, 2-benzisothiazol-3(2H)-one 1, 1-dioxide (Saccharin and its salts) present in a ratio by weight from about 1:2 to about 10:1, respectively.

14. The chewing gum composition according to claim 4, wherein the intense sweetening agent is a synergistic combination of intense sweetening agents comprising L-alpha-aspartyl-N-(2,2,4,4-tetramethyl-3-thietanyl)-D-alaninamide hydrate (Alitame) and N-L-alpha-aspartyl-L-phenylalanine 1-methyl ester (Aspartame) present in a ratio by weight from about 40:60 to about 90:10, respectively.

15. The chewing gum composition according to claim 1, wherein the intense sweetening agent is a chlorodeoxysugar derivative and the bulk sweetening agent is maltitol.

16. The chewing gum composition according to claim 1, wherein the intense sweetening agent is a chlorodeoxysugar derivative and the bulk sweetening agent is selected from the group consisting of fructose, glucose, maltose, xylitol, mannitol, and sorbitol.

17. The chewing gum composition according to claim 1, wherein the intense sweetening agent is a chlorodeoxysugar derivative and the bulk sweetening agent is maltodextrin.

18. The chewing gum composition according to claim 1, wherein the intense sweetening agent is L-alpha-aspartyl-N-(2,2,4,4-tetramethyl-3-thietanyl)-D-alaninamide hydrate (Alitame) and the bulk sweetening agent is Polydextrose.

19. The chewing gum composition according to claim 1, wherein the intense sweetening agent is N-L-alpha-aspartyl-L-phenylalanine 1-methyl ester (Aspartame) and the bulk sweetening agent is fructose.

20. The chewing gum composition according to claim 1, wherein the intense sweetening agent is present in an amount up to about 0.25%, by weight of the chewing gum composition.

21. The chewing gum composition according to claim 20, wherein the intense sweetening agent is present in an amount up to about 0.20%, by weight of the chewing gum composition.

22. The chewing gum composition according to claim 1, wherein the bulk sweetening agent is present in an amount from about 10% to about 25%, by weight of the chewing gum composition.

23. A method for preparing a chewing gum composition having longer lasting sweetness which comprises the steps of:
  (A) providing the following ingredients in percentages by weight of the total composition:
    (a) a soft polyvinyl acetate gum base in an amount from about 60% to about 70%;
    (b) a flavoring agent;
    (c) an intense sweetening agent in an amount up to about 0.3%; and
    (d) a bulk sweetening agent in an amount from about 10% to about 40%;
  (B) melting the gum base;
  (C) admixing from about ⅓ to about ⅔ of the bulk sweetening agent to the melted gum to form a uniform mixture;
  (D) admixing the remaining bulk sweetening agent and intense sweetening agent to the mixture of step (C) to form a uniform mixture; and
  (E) admixing the flavoring agent to the mixture of step (D) to form a uniform mixture.

24. The method according to claim 23, wherein the intense sweetening agent is selected from the group consisting of 1, 2-benzisothiazol-3(2H)-one 1, 1-dioxide (Saccharin and its salts), chlorodeoxysugar derivatives, and L-alpha-aspartyl-N-(2,2,4,4-tetramethyl-3-thietanyl)-D-alaninamide hydrate (Alitame), and mixtures thereof.

25. The method according to claim 23, wherein the intense sweetening agent is a synergistic combination of intense sweetening agents selected from the group consisting of:
  (a) a chlorodeoxysugar derivative and N-L-alpha-aspartyl-L-phenylalanine 1-methyl ester (Aspartame) present in a ratio by weight from about 65:35 to about 91.7:8.3, respectively;
  (b) a chlorodeoxysugar derivative and L-alpha-aspartyl-N-(2,2,4,4-tetramethyl-3-thietanyl)-D-alaninamide hydrate (Alitame) present in a ratio by weight from about 65:35 to about 91.7:8.3, respectively;
  (c) a chlorodeoxysugar derivative and 1, 2-benzisothiazol-3(2H)-one 1, 1-dioxide (Saccharin and its salts) present in a ratio by weight from about 4:1 to about 1:4, respectively;
  (d) a chlorodeoxysugar derivative and the potassium salt of 6-methyl-,2,3-oxathiazin-4(3H)-one-2,2-dioxide (Acesulfame-K) present in a ratio by weight from about 4:1 to about 1:4, respectively;
  (e) the potassium salt of 6-methyl-1,2,3-oxathiazin-4(3H)-one-2,2-dioxide (Acesulfame-K) and L-alpha-Aspartyl-N-(2,2,4,4-tetramethyl-3-thietanyl)-D-alaninamide hydrate (Alitame) present in a ratio by weight from about 99.5:0.5 to about 80:20, respectively;
  (f) N-L-alpha-aspartyl-L-phenylalanine-1-methyl ester (Aspartame) and 1, 2-benzisothiazol-3(2H-one 1, 1-dioxide (Saccharin and its salts) present in a ratio by weight from about 5:1 to about 1:5, respectively;

(g) the potassium salt of 6-methyl-1,2,3-oxathiazin-4(3H)-one-2,2-dioxide (Acesulfame-K) and N-L-alpha-aspartyl-L-phenylalanine-1-methyl ester (Aspartame) present in a ratio by weight from about 1:10 to about 10:1, respectively;

(h) the potassium salt of 6-methyl-1,2,3-oxathiazin-4(3H)-one-2,2-dioxide (Acesulfame-K) and cyclohexylsulfamic acid (Cyclamate and its salts) present in a ratio by weight from about 3:1 to about 1:12, respectively;

(i) the potassium salt of 6-methyl-1,2,3-oxathiazin-493H)-one-2,2-dioxide (Acesulfame-K) and 1, 2-benzisothiazol-3(2H)-one 1, 1-dioxide (Saccharin and its salts) present in a ratio by weight from about 1:2 to about 10:1, respectively; and (k) L-alpha-aspartyl-N-(2,2,4,4-tetramethyl-3-thietanyl)-D-alaninamide hydrate (Alitame) and N-L-alpha-aspartyl-L-phenylalanine 1-methyl ester (Aspartame) present in a ratio by weight from about 40:60 to about 90:10, respectively.

26. The method according to claim 23, wherein the intense sweetening agent is a chlorodeoxysugar derivative and the bulk sweetening agent is maltitol.

27. The method according to claim 23, wherein the intense sweetening agent is a chlorodeoxysugar derivative and the bulk sweetening agent is selected from the group consisting of fructose, glucose, maltose, xylitol, mannitol, and sorbitol.

28. The method according to claim 23, wherein the intense sweetening agent is a chlorodeoxysugar derivative and the bulk sweetening agent is maltodextrin.

29. The method according to claim 23, wherein the intense sweetening agent is L-alpha-aspartyl-N-(2,2,4,4-tetramethyl-3-thietanyl)-D-alanin-amide hydrate (Alitame) and the bulk sweetening agent is Polydextrose.

30. The method according to claim 23, wherein the intense sweetening agent is N-L-alpha-aspartyl-L-phenylalanine 1-methyl ester (Aspartame) and the bulk sweetening agent is fructose.

* * * * *